United States Patent
Guillaume et al.

(10) Patent No.: US 12,347,063 B2
(45) Date of Patent: Jul. 1, 2025

(54) METHOD FOR PERFORMING NON-LOCAL DEMOSAICING OF AN IMAGE, AND ASSOCIATED DEVICE

(71) Applicants: AIRBUS DEFENCE AND SPACE SAS, Toulouse (FR); CENTRE NATIONAL D'ETUDES SPATIALES, Paris (FR)

(72) Inventors: Laurent Guillaume, Toulouse (FR); Carole Thiebaut, Toulouse (FR); Thien Anh Nguyen, Toulouse (FR)

(73) Assignees: AIRBUS DEFENCE AND SPACE SAS, Toulouse (FR); CENTRE NATIONAL D'ETUDES SPATIALES, Paris (FR)

( * ) Notice: Subject to any disclaimer, the term of this patent is extended or adjusted under 35 U.S.C. 154(b) by 0 days.

(21) Appl. No.: 18/859,833

(22) PCT Filed: Apr. 21, 2023

(86) PCT No.: PCT/EP2023/060515
§ 371 (c)(1),
(2) Date: Oct. 24, 2024

(87) PCT Pub. No.: WO2023/208783
PCT Pub. Date: Nov. 2, 2023

(65) Prior Publication Data
US 2025/0173818 A1    May 29, 2025

(30) Foreign Application Priority Data
Apr. 27, 2022 (FR) ...................................... 2203915

(51) Int. Cl.
G06T 3/4015 (2024.01)
G06T 5/70 (2024.01)

(52) U.S. Cl.
CPC .............. G06T 3/4015 (2013.01); G06T 5/70 (2024.01)

(58) Field of Classification Search
CPC ....... G06T 3/4015; G06T 5/70; G06T 3/4053; G06T 2207/10052; G06T 3/08;
(Continued)

(56) References Cited

U.S. PATENT DOCUMENTS

| 5,629,734 A | 5/1997 | Hamilton, Jr. et al. |
| 6,618,503 B2 * | 9/2003 | Hel-Or ................ H04N 23/843 358/518 |

(Continued)

FOREIGN PATENT DOCUMENTS

| CN | 11539893 A | * | 8/2020 | ............... G06T 5/70 |
| EP | 3522106 A1 | * | 8/2019 | ........... G06T 3/4015 |
| EP | 3547680 A1 | * | 10/2019 | ....... H01L 27/14601 |

OTHER PUBLICATIONS

International Search Report with English Translation for PCT/EP2023/060515, mailed Jul. 20, 2023, 4 pages.
(Continued)

Primary Examiner — Jose L Couso
(74) Attorney, Agent, or Firm — Nixon & Vanderhye P.C.

(57) ABSTRACT

A demosaicing method is disclosed as being applied to an initial image in order to obtain a demosaiced image, enabling an improved demosaicing due to the fact that it includes a noise variance stabilization transformation, for each reference patch: a determination of a set of similar patches, a determination of a covariance matrix for said set of similar patches, and for each similar patch, a calculation of estimates of the interpolated spectral bands according to a block-based deconstruction of the covariance matrix as a function of the phasing, a determination of the interpolated spectral bands by an aggregation of estimates of the inter-
(Continued)

polated spectral bands, and an inverse transformation of the stabilization transformation.

16 Claims, 7 Drawing Sheets

(58) Field of Classification Search
CPC .......... G06T 7/536; G06T 7/55; G06T 7/557; G06T 5/4007; G06T 7/90; G06T 2207/10024; G06T 7/60; H04N 13/257; H04N 23/10; H04N 23/843; H04N 25/134; H04N 25/11; H04N 2209/045; H04N 2209/046; H04N 23/45; H04N 23/741; H04N 25/13; H04N 9/646; H04N 25/447
See application file for complete search history.

(56) References Cited

U.S. PATENT DOCUMENTS

| | | | | |
|---|---|---|---|---|
| 7,030,917 | B2* | 4/2006 | Taubman | H04N 25/134 |
| | | | | 358/518 |
| 9,645,680 | B1* | 5/2017 | El Dokor | G06F 3/0488 |
| 2009/0295934 | A1* | 12/2009 | Au | G06T 3/4015 |
| | | | | 348/E3.012 |
| 2010/0092082 | A1* | 4/2010 | Hirakawa | G06T 3/4015 |
| | | | | 382/167 |
| 2012/0307116 | A1* | 12/2012 | Lansel | H04N 23/843 |
| | | | | 348/E9.005 |
| 2017/0039682 | A1* | 2/2017 | Oh | G06T 7/90 |
| 2021/0010862 | A1* | 1/2021 | Raz | H04N 25/135 |
| 2021/0058591 | A1* | 2/2021 | Takashima | H04N 25/17 |
| 2022/0092733 | A1* | 3/2022 | Kim | G06T 3/4046 |
| 2022/0130012 | A1* | 4/2022 | Park | G06T 3/4015 |

OTHER PUBLICATIONS

Written Opinion of the ISA for PCT/EP2023/060515, mailed Jul. 20, 2023, 6 pages.
Hirakawa et al., "Joint demosaicing and denoising", IEEE Transactions On Image Processing, IEEE, vol. 15, No. 8, Aug. 2006, pp. 2146-2157.
Zhang et al., "PCA-Based Spatially Adaptive Denoising of CFA Images for Single-Sensor Digital Cameras", IEEE Transactions On Image Processing, IEEE, vol. 17, No. 4, Apr. 2009, pp. 797-812.
Buades et al., "CFA Video Denoising and Demosaicking Chain via Spatio-Temporal Patch-Based Filtering", IEEE Transactions On Circuits and Systems for Video Technology, IEEE, vol. 30, No. 11, Nov. 27, 2019, pp. 4143-4157.
Buades et al., "Self-similarity driven color demosaicking", IEEE Transactions on Image Processing, 2009, vol. 18, No. 7, pp. 1192-1202. "Applicant respectfully submits that the 2009 date of the Baudes NPL is sufficiently earlier than the effective U.S. filing date of Oct. 24, 2024.".
Lebrun et al., "Implementation of the "Non-Local Bayes" (NL-Bayes) Image Denoising Algorithm", Image Processing On Line 3, Jun. 17, 2013, pp. 1-42.

* cited by examiner

| R | V | R | V | R |
|---|---|---|---|---|
| V | B | V | B | V |
| R | V | R | V | R |
| V | B | V | B | V |
| R | V | R | V | R |

FIG. 1

Key: V (vert) = G (green)

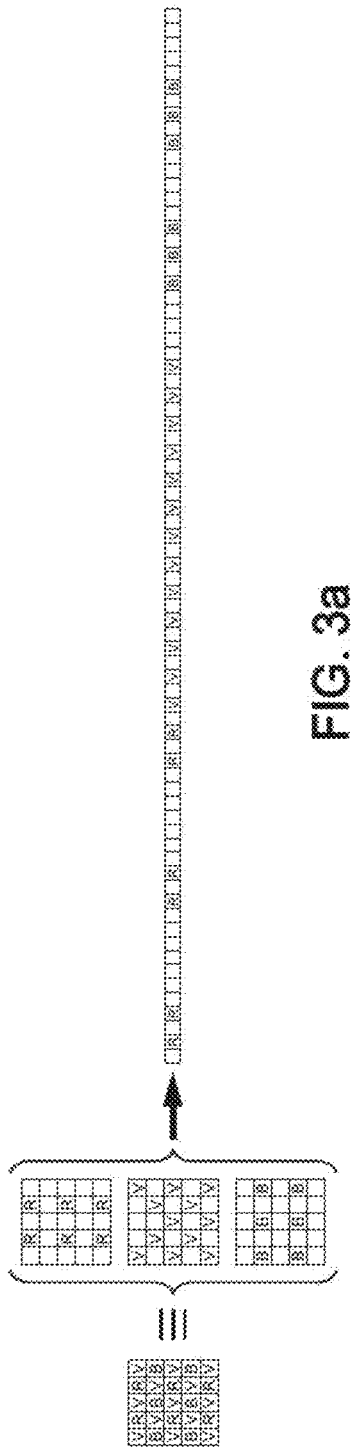
Key: V (vert) = G (green)

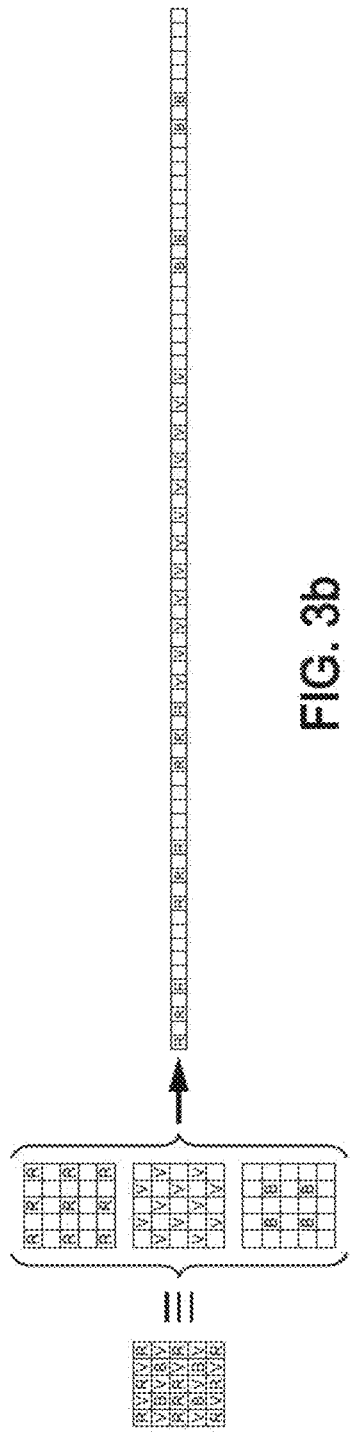
Key: V (vert) = G (green)

METHOD FOR PERFORMING NON-LOCAL DEMOSAICING OF AN IMAGE, AND ASSOCIATED DEVICE

CROSS REFERENCE TO RELATED APPLICATIONS

The present application is a National Phase of International Application Number PCT/EP2023/060515 filed Apr. 21, 2023, which designated the U.S. and claims priority benefits from French Application No. FR2203915, filed Apr. 27, 2022, the entire contents of each of which are hereby incorporated by reference.

TECHNICAL FIELD

This application relates to a method for demosaicing an image. The method applies in particular to the demosaicing of images whose components are arranged according to a Bayer pattern in the RGB domain.

PRIOR ART

An image obtained by a multi-spectral sensor array is generally mosaiced. An image is for example acquired in the form of pixels with one color component, or "single color luminescence", and transformed by demosaicing into pixels with several spectral bands, or "multicolor luminescence". The initial image is thus formed of a set of pixels where each pixel of the image corresponds to only one spectral band among the spectral bands that may be captured at other pixels of the multi-spectral sensor array, each pixel of the multi-spectral sensor array only capturing a portion of the multi-spectral information.

A typical case is that of sensors organized according to the Bayer matrix, which is composed of green filters at 50% and red and blue filters at 25% each. In a Bayer matrix, each square group of four pixels comprises two green pixels on one diagonal, and one red and one blue pixel on the other diagonal. In this example, demosaicing therefore aims to interpolate the two missing values among red, green, and blue, for each pixel of the initial image.

Various demosaicing techniques have already been proposed. In particular, what is referred to as the Hamilton-Adams method is known, described in the publication by J. Hamilton Jr. and J. Adams Jr., "Adaptive color plane interpolation in single sensor color-electronic camera, 1997", corresponding to U.S. Pat. No. 5,629,734.

Also known is the publication by A. Buades et al., "Self-similarity Driven Demosaicking", in Image Processing On Line, 2011-06-01, ISSN 2105-1232.

However, the proposed methods generally only allow obtaining limited image quality, insufficient in particular for space applications such as observation of the Earth.

SUMMARY

In view of the above, an object of the invention is to propose a method for demosaicing images that is improved compared to the state of the art.

In this respect, the invention proposes a demosaicing method applied to an initial image having pixels each corresponding to an initial spectral band, in order to obtain a demosaiced image with several spectral bands having pixels each corresponding to said initial spectral band or to an interpolated spectral band, characterized in that it comprises:

a noise variance stabilization transformation, applied to the pixels of the initial spectral bands, on the basis of a plurality of predetermined reference patches and for each reference patch among the plurality of reference patches:

a determination of a set of patches similar to said reference patch, by making use of the pixels of at least one of the transformed initial spectral bands a determination of a covariance matrix for said set of similar patches, and for each similar patch of said set of similar patches, a calculation of estimates of the interpolated spectral bands according to a block-based deconstruction of the covariance matrix, where the deconstruction into four blocks is a function of the phasing of each similar patch, a determination of the interpolated spectral bands by an aggregation of estimates of the interpolated spectral bands, where the estimates of the interpolated spectral bands are aggregated for each pixel, and an inverse transformation of the stabilization transformation, applied to the pixels of the transformed initial spectral bands.

According to one feature of the invention, the noise variance stabilization transformation is carried out based on a noise model specific to the detector.

According to another feature of the invention, the predetermined reference patches are distributed so as to cover a determined proportion of the image.

According to another feature of the invention, during the determination of the covariance matrix for the set of similar patches, the similar patches comprise transformed initial spectral bands and intermediate spectral bands, these intermediate spectral bands being derived from a prior demosaicing by linear interpolation applied to the stabilized initial image.

According to another feature of the invention, the determination of said set of patches which are similar to each reference patch is determined by a similarity function applied to an intermediate image resulting from prior demosaicing by linear interpolation of the stabilized initial image, the similarity function using one or more of the spectral bands of the intermediate image.

According to another feature of the invention, during the determination of the covariance matrix for the set of similar patches, the similar patches comprise transformed initial spectral bands and intermediate spectral bands, these intermediate spectral bands being derived from a prior demosaicing by linear interpolation and a prior denoising which are applied to the stabilized initial image.

According to another feature of the invention, the determination of said set of patches which are similar to each reference patch is determined by a similarity function applied to an intermediate image resulting from prior demosaicing by linear interpolation and prior denoising of the stabilized initial image, the similarity function using one or more of the spectral bands of the intermediate image.

According to another feature of the invention, the denoising consists of a local denoising function applied to each patch and as a function of said set of patches which are similar to the patch considered.

According to another feature of the invention, the spectral bands correspond to the RGB or YUV color space.

According to another feature of the invention, the spectral bands correspond to the RGB color space and the pixels of the initial image are organized according to a Bayer pattern.

According to another feature of the invention, the aggregation of estimates of the interpolated spectral bands is carried out by calculating an average of these estimates of the interpolated spectral bands.

In some embodiments, the deconstruction into four blocks as a function of the phasing of said similar patch, is based on the pair (L, C) corresponding to the $L^{th}$ pixel and $C^{th}$ pixel of said similar patch, each value of the matrix at row L and at column C being, depending on whether it concerns:

- a pixel L corresponding to a transformed initial spectral band and a pixel C corresponding to a transformed initial spectral band, allocated to a first block $\Sigma_{dd}$
- a pixel L not corresponding to an initial spectral band and a pixel C corresponding to a transformed initial spectral band, allocated to a second block $\Sigma_{md}$
- a pixel L corresponding to a transformed initial spectral band and a pixel C not corresponding to an initial spectral band, allocated to a third block $\Sigma_{dm}$ or

- a pixel L not corresponding to an initial spectral band and a pixel C not corresponding to an initial spectral band, allocated to a fourth block $\Sigma_{mm}$.

According to another feature of the invention, for each similar patch in said set of similar patches, the calculation of estimates of the interpolated spectral bands is carried out as follows:

$$x_m = \bar{y}_m + \sum_{md}\sum_{dd}^{-1}(y_d - \bar{y}_d)$$

where:
- $x_m$ is the vector of estimates of the interpolated spectral bands of said similar patch,
- $\bar{y}_m$ is the vector of average values of the pixels of the patches of said set of similar patches, where the pixels not corresponding to an initial spectral band are considered,
- $y_d$ is the vector of pixels corresponding to a transformed initial spectral band in said similar patch,
- $\bar{y}_d$ is the vector of average values of the pixels of the patches of said set of similar patches, where the pixels corresponding to a transformed initial spectral band are considered,
- $\Sigma_{dd}^{-1}$ is the inverse matrix of the first block $\Sigma_{dd}$, and $\Sigma_{md}$ is the second block.

According to another feature of the invention, during the calculation of estimates of the interpolated spectral bands for similar patches having a same phasing, a same deconstruction of the covariance matrix into blocks occurs, these blocks being stored and reused for all these similar patches having the same phasing.

This disclosure also relates to a computer program product, comprising code instructions for implementing the method according to the preceding description, when it is executed by a computer.

This disclosure also relates to an image processing device comprising a computer, characterized in that it is configured to implement the method according to the preceding description.

Advantageously, this method makes it possible to obtain improved results in terms of reconstruction quality and robustness to noise. The method according to the invention makes it possible in particular to reduce or even eliminate iridescent-type inaccuracies.

Also advantageously, the use of a transformation to regularize the image variance allows improving the estimation of local noise during denoising. The transformation to regularize the image variance also allows improving the final quality of the image due to an improvement in the estimation of the similarity calculation, jointly taking into account all available spectral bands of a multi-spectral sensor, such as a Bayer filter for example.

The described method also makes it possible to take into account spatial distribution in the variation in accuracy, which is not necessarily isotropic, due to the covariance matrix. The method is indeed advantageously non-local and is based on the similarities between a patch of pixels of the image and a set of similar patches, which may be positioned nearby or far away in the initial image.

BRIEF DESCRIPTION OF DRAWINGS

Other features, details, and advantages will become apparent upon reading the detailed description below, made in reference to the figures given as an example, in which:

FIG. 1 represents an example patch of an initial image where the pixels are organized in a Bayer pattern.

FIG. 3a represents an example of a vector obtained from a patch of an image before demosaicing.

FIG. 3b represents an example of a vector obtained from a patch of an image before demosaicing, the patch corresponding to a different phasing than that represented in FIG. 3a.

DESCRIPTION OF EMBODIMENTS

Figure 2A:
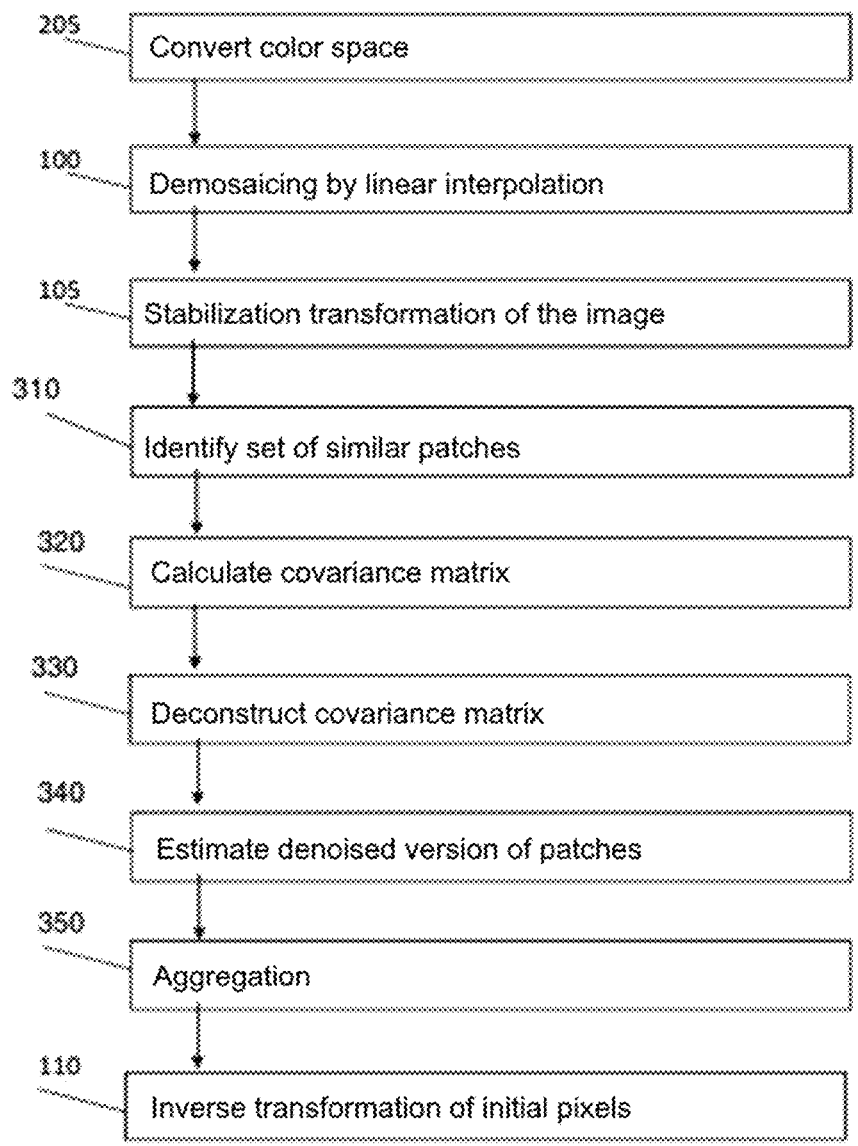
FIG. 2a schematically represents the main steps of the demosaicing method according to one exemplary embodiment of the invention.
Figure 2B:
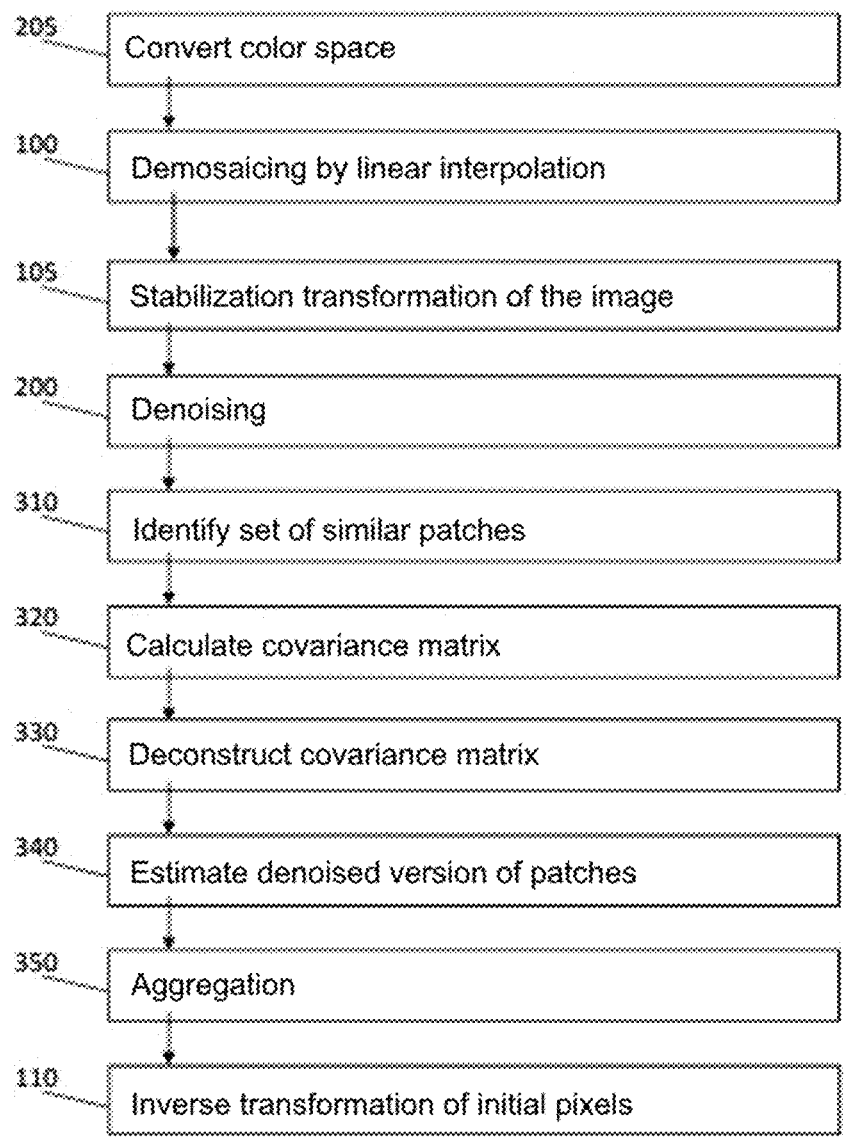
FIG. 2b schematically represents the main steps of the demosaicing method according to another exemplary embodiment of the invention.

With reference to FIGS. 2a and 2b, we will now describe examples of methods for demosaicing an image provided by a sensor, referred to as an initial image. The initial images may be composed of pixels belonging to a color space, for example a three-color space. The initial images may also be radar images. The pixels of the initial image each correspond to an initial spectral band. The number of spectral bands is not limiting to the invention.

Figure 5:
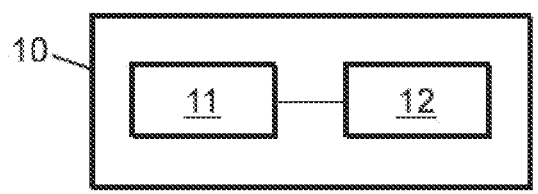
FIG. 5 schematically represents an example of an image processing device suitable for implementing the demosaicing method.

The demosaicing method according to the invention may be implemented by an image processing device 1 represented schematically in FIG. 5, comprising a computer 10 which for example may be a processor equipped or not equipped with a graphics card, a microprocessor, or a microcontroller. Image processing device 1 comprises in particular a communication interface with at least one sensor supplying initial images. Image processing device 1 may also comprise a memory 11 storing code instructions executed by the computer in order to implement the method, as well as the data necessary for processing one or more images.

The initial image is formed of a set of pixels each having an initial spectral band corresponding for example to a specific value for a color detected among a set of colors of the multi-spectral sensor.

The multi-spectral sensor may for example be of the RGB type where spectral bands detected in each pixel of the image are red, green, or blue, the sensor being equipped for this purpose with a color filter array adapted to allow only a portion of the light spectrum to pass through for each pixel of the array.

According to another embodiment, the detected spectral bands correspond to the YUV color space.

Other spectral bands may also be used for use at the sensor output or after a color transformation of the planes.

The demosaicing method may be applied to several spectral bands, such as in the color space for example, the values of certain pixels being available in the form of the initial spectral band while other missing ones are to be interpolated. Again, the number of spectral bands is not limiting.

The sensor generating the initial image may, for example, have a Bayer configuration, as shown in FIG. 1, in the RGB color space. Each green pixel is represented by the letter "V", each red pixel is represented by the letter "R", and each blue pixel is represented by the letter "B". In this configuration, the components of the color space are red, green, and blue. 50% of the pixels correspond to the green spectral band, 25% of the pixels correspond to the red spectral band, and 25% of the pixels correspond to the blue spectral band. The pixels are organized so that in a square of two pixels per side, the two pixels on one diagonal correspond to the green spectral band while the other diagonal includes a red pixel and a blue pixel.

As represented in FIG. 2a, the demosaicing method comprises, for example, a prior demosaicing by linear interpolation 100 of the initial image, making it possible to calculate intermediate spectral bands. In the case where the spectral bands correspond to the RGB color space, this involves associating each pixel with the two missing spectral bands among red, green, and blue. Here, the intermediate spectral bands are a means of intermediate calculation.

This demosaicing by linear interpolation 100 may be selected among the demosaicing methods known to those skilled in the art. For example, in the case where the color space is RGB, demosaicing by linear interpolation may be implemented by means of the Hamilton-Adams algorithm, as described in U.S. Pat. No. 5,652,621.

The method according to the invention then comprises a noise variance stabilization transformation step 105, applied to the pixels of the initial spectral bands, such as an Anscombe transform for example. The transformed image, designated a stabilized image, will thus have a variance that is regular and equal, pixel by pixel, allowing a more stable and more precise calculation of similar patches.

In the context of a detector where the noise model is written with a standard deviation $\sqrt{a^2+bX}$ where a and b are constants and X is the signal in the pixel concerned, the Anscombe transform appears for example in the following form for a pixel of value X:

$$TA(X) = Y = 2\sqrt{\frac{X}{b} + \frac{3}{8} + \frac{a^2}{b^2}}$$

The stabilized image will also allow Wiener filtering to be performed, which relies on a local estimate of the noise variance per pixel, in order to calculate the estimate of similar patches.

For Wiener filtering, denoting the pixels of the initial image as x and those of the denoised image as y, for a patch denoted k among the similar patches S:

$$y_k = \bar{x}_S + \left(\sum\nolimits_S - \sigma I\right)\sum\nolimits_S^{-1}(x_k - \bar{x}_S)$$

where $\Sigma_S$ is the covariance matrix of the similar patches S, $\bar{x}_S$ is the average of the similar patches S, and $\sigma$ is the noise value in the pixel which is equal to 1 after the Anscombe transform.

The calculation of the distance between patches may be considered independently per band or preferably in a multi-band manner, the covariance matrix then being calculated using all available phasings.

In another embodiment, as represented in FIG. 2b, the demosaicing method may further comprise denoising processing 200 applied to the output from the noise variance stabilization transformation 105, to obtain the stabilized image. During denoising, the estimation of local noise is advantageously improved due to prior application of the transformation to regularize the variance.

The estimated noise model of the detectors, by spectral band, is for example used to manage all the bands jointly and to estimate the local noise of the patches, while avoiding the introduction of possible artifacts into the image.

This denoising processing 200 may be selected from the denoising processing methods known to those skilled in the art, for example such as an NL-Bayes type algorithm, as described in the article by M. Lebrun et al., "Implementation of the 'Non-Local Bayes' (NL-Bayes) Image Denoising Algorithm". The NL-Bayes denoising algorithm includes for example the repetition, two times in succession, of an identification of a set of similar patches of the image in order to calculate a covariance matrix for the set of similar patches, an estimation of a denoised version, based on the covariance matrix, and an aggregation in order to obtain a denoised image. Denoising is for example implemented twice in succession, the first time on the image obtained after demosaicing by linear interpolation and the second time on the denoised image.

The denoising algorithm performs, for example, one processing per patch of the image.

It is also conceivable to perform denoising processing that does not include calculating a covariance matrix.

Throughout the remainder of the description, a patch is a square-shaped piece of the image comprising a subset of pixels of the image. A patch may comprise between 2 and 10 pixels per side and typically comprises between 3 and 5. A patch of k=5 pixels per side is used as an example in this description.

The demosaicing method then comprises, for example, a set of steps implemented on at least one patch of the image and preferably on the set of patches of the image, considered successively. Some reference patches are for example determined in advance and there are overlaps between two successive patches, so that the entire image is covered. The reference patches for example may or may not be contiguous. Contiguous reference patches for example may or may not overlap. Non-contiguous reference patches for example may be spaced more or less apart from one another. For non-contiguous reference patches, an uncovered area of the image is for example less than 50% of the image, possibly less than 25% of the image, or even possibly less than 5% of the image. The choice of proportion of the image covered by the reference patches and their possible overlap will be optimized according to the use cases. The proportion of the image covered by the reference patches is for example between 50% and 100%.

For each patch considered, designated as a reference patch, a step 310 of identifying a set of patches of the image which are similar to the reference patch is carried out. Step 310 of identifying a set of patches of the image which are similar to the patch considered may be implemented by calculating a distance between the patch considered and each of the patches of the image that are in the vicinity of the patch considered, the vicinity being defined as a portion of the image of size n×n, where n is a number of pixels strictly greater than the number of pixels k in one side of a patch, and less than or equal to the number of pixels in the smallest side of the image.

The distance may be calculated in native radiometry, i.e. from the initial spectral bands in the initial image.

The distance may also be calculated from the transformed spectral bands. In order to use the correlations between the spectral bands, as an example it is possible to concatenate the patches of the different spectral bands in order to create a single inter-band patch of size k×k×N and to use the Euclidean distance on this patch as follows:

$$d(P,Q) = \sqrt{\Sigma_N(P_{i,N} - Q_{i,N})^2 / Nk^2}$$

The distance may be calculated for all of patches P and Q concerned or for only a portion of them, for example a horizontal or vertical band.

The distance may be calculated in native radiometry, or in the transformed image, i.e. from the initial spectral bands in the initial image or from the transformed initial spectral bands. In the example of the Bayer matrix, this would amount to:

$$d(P, Q) = \sqrt{((P_{i,R} - Q_{i,R})^2 + (P_{i,G} - Q_{i,G})^2 + (P_{i,B} - Q_{i,B})^2)/3k^2}$$

where the index R, G, B respectively corresponds to the component in the color red, green or blue, of patch P or Q respectively.

Alternatively, the initial image may be converted beforehand, before the noise variance stabilization transformation, into another color space during a step 205, and the normalized quadratic distance may be calculated in this space. For example, if the initial image is in the RGB domain, the image may be converted into the YUV domain according to a transformation known to those skilled in the art. In this case, the normalized quadratic distance can be calculated on the one luminance component Y. The initial image will for example be converted before the linear interpolation demosaicing step 100, as shown in FIG. 2a or 2b. The initial image may also be converted before the noise variance stabilization transformation, but after the linear interpolation demosaicing step 100.

The distance is for example compared to a determined threshold, below which the patches are considered to be similar. The distance is preferably calculated from a transformed image, the threshold thus being directly linked to the local noise, which allows more efficient denoising.

It is also possible to provide for a minimum number of similar patches corresponding to the calculated minimum distances.

It is also possible to provide for a minimum number of similar patches corresponding to the calculated minimum distances, to which are added the patches whose distance is less than the determined threshold.

According to a variant embodiment, the identification of a set of patches similar to the patch considered may comprise the application of a principal component analysis of the image in native, transformed, or converted coordinates, and the calculation of a distance (e.g. Euclidean) for the most significant components resulting from this analysis.

According to another embodiment, similar patches may be determined and stored during a prior denoising step.

The demosaicing method comprises a following step 320 of calculating a covariance matrix for the set of patches similar to the reference patch.

The covariance matrix may be calculated on the values of the pixels of the patches in the transformed initial spectral bands represented in the stabilized initial image.

According to another embodiment, the covariance matrix may also be calculated on the pixels of an intermediate image obtained via demosaicing by linear interpolation, as represented in FIG. 2a, and possibly supplemented by denoising, as represented in FIG. 2b.

A covariance matrix calculated during a previous processing may possibly be reused.

For the calculation of the covariance matrix for a given set of patches, each patch P is represented by a vector (P(1) ... P(n)) where n corresponds to the multiplication of the number of pixels contained in the patch by the number of spectral bands. For example, for the three-color space, the coordinates of the vector from 1 to n/3 correspond to the values of the pixels of the patch for the first color, the coordinates from n/3+1 to 2n/3 correspond to the values of the pixels of the patch for the second color, and the coordinates from 2n/3+1 to n correspond to the values of the pixels of the patch for the third color. Each value of a coordinate of a patch is for example:

the initial spectral band of the pixel available in the initial image as output from the sensor, or the intermediate spectral band obtained via demosaicing by linear interpolation, possibly supplemented by denoising.

For example, for patches in RGB colorimetry which are 5 pixels by 5 pixels in size, the patches comprise 3×5×5=75 spectral bands, of which 25 are available in the initial image and 50 are missing.

Each patch of k pixels on a side in the initial image is represented as a vector in which the first $k^2$ terms correspond to one spectral band, for example the color red, the following $k^2$ terms correspond to another spectral band, for example the color green, and the last $k^2$ terms correspond to a third spectral band, for example the color blue.

The covariance matrix is therefore a matrix where each term is defined as follows:

$$u_{ij} = \frac{1}{N} \sum_{k=1}^{N} (P_k(i) - \mu_i)(P_k(j) - \mu_j)$$

where:
i and j are the indices of coordinates in the matrix,
Pk(i) is the value of the $i^{th}$ coordinate of the $k^{th}$ patch,
$\mu_i$ is the average of Pk(i) for all k varying from 1 to N,
$\mu_j$ is the average of Pk(j) for all k varying from 1 to N,
N is the number of similar patches in the set of patches that are similar to the reference patch.

The covariance matrix therefore quantifies the covariance of the values of pixels of similar patches.

In the remainder of the method, the availability of a pixel, meaning having a transformed initial spectral band, or the unavailability of a pixel, meaning not having an initial spectral band, is exploited for an image having several spectral bands. The locations of pixels that are available or unavailable depend on the phasing of the patch. To determine the phasing of a patch, one must consider the location on the sensor array of a corresponding patch in the initial image. In the case for example of a Bayer pattern, there are four possible phasings, of which two examples are represented in FIGS. 3a and 3b. Also in these figures, the pixels having an initial value according to the respective red, green, or blue component are represented respectively by the letters R, V, B. FIG. 3a corresponds to a phasing where the pixel located at the top left of the patch is expressed in the green component of the original image, and FIG. 3b corresponds to a phasing where the pixel located at the top left of the patch is the pixel expressed in the red component.

The demosaicing method then comprises, in step 330, for each similar patch of said set of similar patches, a calculation of estimates of the interpolated spectral bands according to a block-based deconstruction of the covariance matrix, where the deconstruction into four blocks is a function of the phasing of each similar patch.

Figure 4:
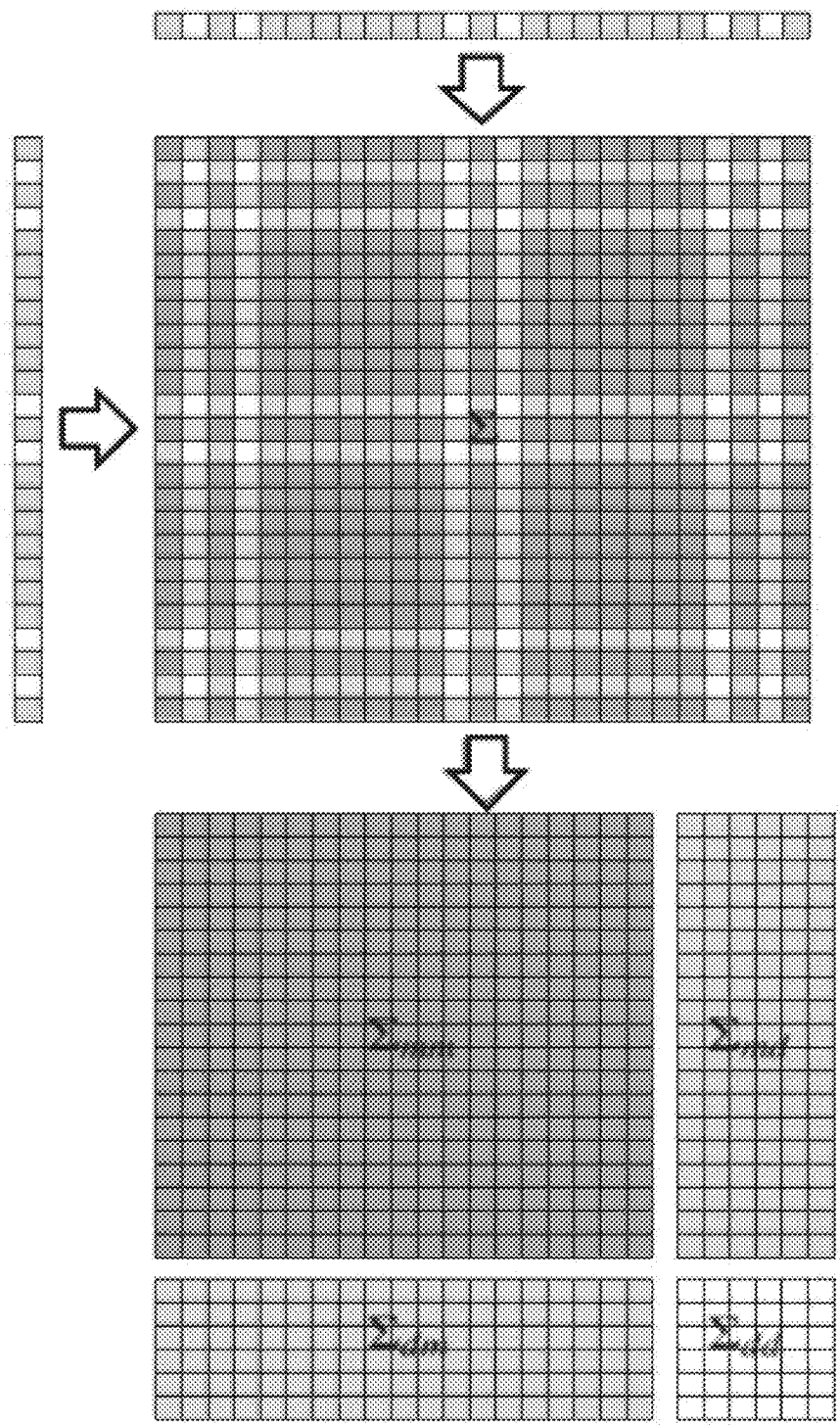
FIG. 4 schematically represents a block-based deconstruction of a covariance matrix for a set of patches that are similar to a patch considered.

With reference to FIG. 4, an example of block-based deconstruction of a covariance matrix according to the availability or unavailability of the spectral bands of the pixels in the initial image has been schematically represented. This block-based deconstruction results for example in four blocks, as a function of the phasing of the similar patch based on a pair (L, C) corresponding to the $L^{th}$ pixel and $C^{th}$ pixel of the similar patch in order to assign each value of the matrix in row L and in column C:

- to block $\Sigma mm$ if pixel L does not correspond to a transformed initial spectral band and pixel C does not correspond to an initial spectral band,
- to block $\Sigma md$ if pixel L does not correspond to an initial spectral band and pixel C corresponds to a transformed initial spectral band,
- to block $\Sigma dm$ if pixel L corresponds to a transformed initial spectral band and pixel C does not correspond to an initial spectral band, or
- to block $\Sigma dd$ if pixel L corresponds to a transformed initial spectral band and pixel C corresponds to an initial spectral band.

In the case of a Bayer pattern for which there are four possible phasings for the patches, all the various block-based deconstructions of the covariance matrix may be calculated and stored for later calculations.

Next, for each block-based deconstruction obtained, the missing values of each patch of a subset of patches of the set E for which the phasing corresponds to the block-based deconstruction, are estimated during a step 340 with a Bayesian estimator of the MAP type (maximum a posteriori):

$$\hat{x}_m = \underset{x_m}{\operatorname{argmax}} P(x_m | y_d)$$

where:
- $\hat{x}_m$ is the maximum a posteriori estimator of $x_m$,
- $x_m$ is the vector of estimates of the interpolated spectral bands of said similar patch
- $y_d$ is the vector of pixels corresponding to a transformed initial spectral band in said similar patch.

The estimates of the interpolated spectral bands are obtained by the following calculation:

$$x_m = \bar{y}_m + \sum\nolimits_{md} \sum\nolimits_{dd}^{-1} (y_d - \bar{y}_d)$$

where:
- $x_m$ is the vector of estimates of the interpolated spectral bands of said similar patch,
- $\bar{y}_m$ is the vector of average values of the transformed pixels of the patches of said set of similar patches, where the pixels not corresponding to an initial spectral band are considered,
- $y_d$ is the vector of pixels corresponding to a transformed initial spectral band in said similar patch,
- $\bar{y}_d$ is the vector of average values of the pixels of the patches of said set of similar patches, where the pixels corresponding to a transformed initial spectral band are considered,
- $\Sigma_{dd}^{-1}$ is the inverse matrix of the block $\Sigma_{dd}$ previously defined, and
- $E_{md}$ is the block previously defined.

In the case where inversion of the matrix corresponding to block $\Sigma_{dd}$ is not possible, the patch will be set to the average value $y_m$ of the similar patches.

The demosaicing method then includes an aggregation step 350 in which estimates of the interpolated spectral bands for pixels of patches belonging to different sets of similar patches in relation to different reference patches. Aggregation is understood to mean the combining of different measurements into a single variable, either by simple addition of the values obtained, or by addition of weighted values. Aggregation is implemented for example by calculating an average of the estimates made for a pixel and a component.

The set of interpolated spectral bands is thus obtained.

A step 110 of inverse transformation of the pixels of the transformed initial spectral bands is then executed, to reestablish the pixels of the spectral bands generated in the initial image.

Using the above notations, the inverse transform appears for example in the form:

$$TA^{-1}(Y) = X = b \times \left( \frac{Y^2}{4} - \frac{3}{8} - \frac{a^2}{b^2} \right)$$

The demosaiced image according to the invention provides improved quality and a significant reduction or even absence of iridescence, particularly for applications requiring high altitude observation such as observation of the Earth.

Appendix: Demonstration of the Estimation Formula.

The maximum a posteriori estimator of $x_m$, the available noisy data $y_d$ being known, is given by:

$$\hat{x}_m = \underset{x_m}{\operatorname{argmax}} P(x_m | y_d)$$

Using the Bayes formula the following results are obtained:

$$\hat{x}_m = \underset{x_m}{\operatorname{argmax}} P(x_m \cap y_d)$$

$$= \underset{x_m}{\operatorname{argmax}} e^{-\frac{1}{2}[x_m - \bar{x}_m \ \ y_d - \bar{y}_d]} \begin{bmatrix} \Sigma_{mm} & \Sigma_{md} \\ \Sigma_{dm} & \Sigma_{dd} \end{bmatrix}^{-1} \begin{bmatrix} x_m - \bar{x}_m \\ y_d - \bar{y}_d \end{bmatrix}$$

$$\begin{bmatrix} \Sigma_{mm} & \Sigma_{md} \\ \Sigma_{dm} & \Sigma_{dd} \end{bmatrix}$$

is the covariance matrix of the missing data (not noisy) and available data (noisy).
We can write:

$$\begin{bmatrix} \Sigma_{mm} & \Sigma_{md} \\ \Sigma_{dm} & \Sigma_{dd} \end{bmatrix} = \begin{bmatrix} A & B \\ C & D \end{bmatrix}$$

with A, B, C, D of the matrices respectively corresponding to matrices $\Sigma_{mm}, \Sigma_{md}, \Sigma_{dm}$ and $\Sigma_{dd}$, $$\hat{x}_m = \underset{x_m}{\operatorname{argmax}}\ e^{-\frac{1}{2}[x_m-\bar{x}_m\ y_d-\bar{y}_d]\begin{bmatrix}A & B \\ C & D\end{bmatrix}^{-1}\begin{bmatrix}x_m-\bar{x}_m \\ y_d-\bar{y}_d\end{bmatrix}}$$

$$= \underset{x_m}{\operatorname{argmin}}[x_m - \bar{x}_m\ y_d - \bar{y}_d]\begin{bmatrix}A & B \\ C & D\end{bmatrix}^{-1}\begin{bmatrix}x_m - \bar{x}_m \\ y_d - \bar{y}_d\end{bmatrix}$$

$$= \underset{x_m}{\operatorname{argmin}}(x_m - \bar{x}_m)^T A(x_m - \bar{x}_m) + (x_m - \bar{x}_m)^T B(y_d - \bar{y}_d) +$$

$$(y_d - \bar{y}_d)^T C(x_m - \bar{x}_m) + (y_d - \bar{y}_d)^T D(y_d - \bar{y}_d)$$

The last term does not depend on $x_m$ and can therefore be deleted. By differentiating with respect to $x_m$ we therefore obtain:

$$2(x_m - \bar{x}_m)^T A + (y_d - \bar{y}_d)^T B^T + (y_d - \bar{y}_d)^T C = 0$$

$$2(x_m - \bar{x}_m)^T A + (y_d - \bar{y}_d)^T (B^T + C) = 0$$

$$2(x_m - m)^T A + (y_d - \bar{y}_d)^T (B^T + C) A^{-1} = 0$$

As the covariance matrix is symmetric, then its inverse is also symmetric. We therefore have $B^T = C$. Using formulas for block inversion (Shur complement) we can show that $$CA^{-1} = -\sum_{dd}^{-1}\sum_{dm}.$$

We obtain $$(x_m - \bar{x}_m)^T - (y_d - \bar{y}_d)^T \sum_{dd}^{-1}\sum_{dm} = 0$$

$$x_m - \bar{x}_m = \left(\sum_{dd}^{-1}\sum_{dm}\right)^T (y_d - \bar{y}_d)$$

$$x_m - \bar{x}_m = \sum_{md}\sum_{dd}^{-1}(y_d - \bar{y}_d)$$

$$x_m = \bar{x}_m + \sum_{md}\sum_{dd}^{-1}(y_d - \bar{y}_d)$$

It is assumed that similar patches have been chosen such that $\bar{y}_m \approx \bar{x}_m$.

$$x_m = \bar{y}_m + \sum_{md}\sum_{dd}^{-1}(y_d - \bar{y}_d)$$

If we use denoised data to calculate the covariance matrix for the available data, we can use the approximation:

$$\sum_{dd} \approx \sum_{dd}^{denoised} + \sigma^2 I$$

where $\Sigma_{dd}^{denoised}$ is the block of the covariance matrix calculated on the available denoised data, I is the identity matrix, and $\sigma^2$ is the variance for the noise. We can show that $\Sigma_{md}$ is unchanged in this case. We obtain:

$$x_m = \bar{y}_m + \sum_{md}\left(\sum_{dd}^{denoised} + \sigma^2 I\right)^{-1}(y_d - \bar{y}_d)$$

The invention claimed is:

1. A demosaicing method,
   wherein the method is applied to an initial image having pixels each corresponding to an initial spectral band, in order to obtain a demosaiced image with several spectral bands having pixels each corresponding to said initial spectral band or to an interpolated spectral band; and wherein the method comprises:
   a noise variance stabilization transformation, applied to the pixels of the initial spectral bands,
   on the basis of a plurality of predetermined reference patches and for each reference patch among the plurality of reference patches:
   a determination of a set of patches similar to said reference patch, by making use of the pixels of at least one of the transformed initial spectral bands,
   a determination of a covariance matrix for said set of similar patches, and
   for each similar patch of said set of similar patches, a calculation of estimates of the interpolated spectral bands according to a block-based deconstruction of the covariance matrix, where the deconstruction into four blocks is a function of the phasing of each similar patch,
   a determination of the interpolated spectral bands by an aggregation of estimates of the interpolated spectral bands, where the estimates of the interpolated spectral bands are aggregated for each pixel, and
   an inverse transformation of the stabilization transformation, applied to the pixels of the transformed initial spectral bands.

2. The demosaicing method according to claim 1, wherein the noise variance stabilization transformation is carried out based on a noise model specific to the detector.

3. The demosaicing method according to claim 1, wherein the predetermined reference patches are distributed so as to cover a determined proportion of the image.

4. The demosaicing method according to claim 1, wherein, during the determination of the covariance matrix for the set of similar patches, the similar patches comprise transformed initial spectral bands and intermediate spectral bands, these intermediate spectral bands being derived from a prior demosaicing by linear interpolation applied to the stabilized initial image.

5. The demosaicing method according to claim 4, wherein the determination of said set of patches which are similar to each reference patch is determined by a similarity function applied to an intermediate image resulting from prior demosaicing by linear interpolation of the stabilized initial image, the similarity function using one or more of the spectral bands of the intermediate image.

6. The demosaicing method according to claim 1, wherein, during the determination of the covariance matrix for the set of similar patches, the similar patches comprise transformed initial spectral bands and intermediate spectral bands, these intermediate spectral bands being derived from a prior demosaicing by linear interpolation and a prior denoising which are applied to the stabilized initial image.

7. The demosaicing method according to claim 6, wherein the determination of said set of patches which are similar to each reference patch is determined by a similarity function applied to an intermediate image resulting from prior demosaicing by linear interpolation and prior denoising of the stabilized initial image, the similarity function using one or more of the spectral bands of the intermediate image.

8. The demosaicing method according to claim 6, wherein the denoising consists of a local denoising function applied to each patch and as a function of said set of patches which are similar to the patch considered.

9. The demosaicing method according to claim 1, wherein the spectral bands correspond to the RGB or YUV color space.

10. The demosaicing method according to claim 1, wherein the spectral bands correspond to the RGB color space and the pixels of the stabilized initial image are organized according to a Bayer pattern.

11. The demosaicing method according to claim 1, wherein the aggregation of estimates of the interpolated spectral bands is carried out by calculating an average of these estimates of the interpolated spectral bands.

12. The demosaicing method according to claim 1, wherein the deconstruction into four blocks as a function of the phasing of said similar patch is based on the pair (L,C) corresponding to the $L^{th}$ pixel and $C^{th}$ pixel of said similar patch, each value of the matrix at row L and at column C being, depending on whether it concerns:
- a pixel L corresponding to a transformed initial spectral band and a pixel C corresponding to a transformed initial spectral band, allocated to a first block $\Sigma_{dd}$;
- a pixel L not corresponding to an initial spectral band and a pixel C corresponding to a transformed initial spectral band, allocated to a second block $\Sigma_{md}$;
- a pixel L corresponding to a transformed initial spectral band and a pixel C not corresponding to an initial spectral band, allocated to a third block $\Sigma_{dm}$;

or
- a pixel L not corresponding to an initial spectral band and a pixel C not corresponding to an initial spectral band, allocated to a fourth block $\Sigma_{mm}$.

13. The demosaicing method according to claim 12, wherein, for each similar patch in said set of similar patches, the calculation of estimates of the interpolated spectral bands is carried out as follows:

$$x_m = \bar{y}_m + \sum\nolimits_{md} \sum\nolimits_{dd}^{-1} (y_d - \bar{y}_d)$$

where:
$x_m$ is the vector of estimates of the interpolated spectral bands of said similar patch,
$y_m$ is the vector of average values of the pixels of the patches of said set of similar patches, where the pixels not corresponding to an initial spectral band are considered,
$y_d$ is the vector of pixels corresponding to a transformed initial spectral band in said similar patch,
$y_d$ is the vector of average values of the pixels of the patches of said set of similar patches, where the pixels corresponding to a transformed initial spectral band are considered,
$\bar{y}d$ is the inverse matrix of the first block $\Sigma_{dd}$, and
$\Sigma_{md}$ is the second block.

14. The demosaicing method according to claim 13, wherein, during the calculation of estimates of the interpolated spectral bands for similar patches having a same phasing, a same deconstruction of the covariance matrix into blocks occurs, these blocks being stored and reused for all these similar patches having the same phasing.

15. A non-transitory computer storage device, having stored thereon code instructions which, when executed by a computer, causes said computer to implement the method according to claim 1.

16. An image processing device comprising a computer configured to implement the method according to claim 1.

* * * * *